United States Patent
Beevers

(10) Patent No.: US 8,761,674 B2
(45) Date of Patent: Jun. 24, 2014

(54) ELECTRONIC COMMUNICATION SYSTEM THAT MIMICS NATURAL RANGE AND ORIENTATION DEPENDENCE

(76) Inventor: Timothy R. Beevers, McMinnville, OR (US)

( * ) Notice: Subject to any disclaimer, the term of this patent is extended or adjusted under 35 U.S.C. 154(b) by 528 days.

(21) Appl. No.: 13/035,225

(22) Filed: Feb. 25, 2011

(65) Prior Publication Data

US 2012/0220237 A1 Aug. 30, 2012

(51) Int. Cl.
*H04B 7/00* (2006.01)

(52) U.S. Cl.
USPC ................................. 455/41.3; 455/67.11

(58) Field of Classification Search
USPC ........... 455/41.3, 67.11, 41.1, 41.2, 500, 518, 455/517, 519, 575.2, 575.1
See application file for complete search history.

(56) References Cited

U.S. PATENT DOCUMENTS

| | | | |
|---|---|---|---|
| 4,720,857 A | 1/1988 | Burris et al. | |
| 5,086,464 A | 2/1992 | Groppe | |
| 5,615,410 A | 3/1997 | DeMars | |
| 5,844,984 A | 12/1998 | Yamaguchi et al. | |
| 6,148,175 A | 11/2000 | Freedland | |
| 6,522,765 B1 | 2/2003 | Towle | |
| 6,681,022 B1 | 1/2004 | Puthuff et al. | |
| 7,072,476 B2 | 7/2006 | White | |
| 7,106,874 B2 | 9/2006 | Wieczorek et al. | |
| 7,120,388 B2 | 10/2006 | Hall | |
| 7,327,982 B2 | 2/2008 | Nassimi | |
| 7,620,429 B1 | 11/2009 | Frerking et al. | |
| 7,689,248 B2 | 3/2010 | Valve et al. | |
| 8,320,837 B2 * | 11/2012 | Kohno et al. | 455/67.11 |
| 2003/0100274 A1 | 5/2003 | Brown | |
| 2006/0140435 A1 | 6/2006 | Sheehy et al. | |
| 2007/0058831 A1 | 3/2007 | Rie | |
| 2007/0087780 A1 | 4/2007 | Nassimi | |
| 2008/0085030 A1 | 4/2008 | Smith | |
| 2008/0102906 A1 | 5/2008 | Dijkstra et al. | |
| 2008/0311851 A1 * | 12/2008 | Hansen et al. | 455/41.2 |
| 2009/0017868 A1 | 1/2009 | Ueda et al. | |
| 2009/0023417 A1 | 1/2009 | Davis et al. | |
| 2009/0141923 A1 | 6/2009 | Smith | |
| 2009/0214064 A1 | 8/2009 | Wu et al. | |
| 2010/0045928 A1 | 2/2010 | Levy | |
| 2010/0048134 A1 | 2/2010 | McCarthy et al. | |
| 2010/0077020 A1 * | 3/2010 | Paloheimo et al. | 709/203 |
| 2010/0151911 A1 | 6/2010 | Mazzeo et al. | |
| 2011/0128452 A1 * | 6/2011 | Kim et al. | 348/738 |

* cited by examiner

*Primary Examiner* — Ping Hsieh
(74) *Attorney, Agent, or Firm* — Timothy E. Siegel Patent Law, PLLC; Timothy E. Siegel

(57) ABSTRACT

A short range telephonic communications system that includes transceiving units for receiving a sound signal from a first user and for transmitting an RF signal representative of the sound signal and for receiving RF signals representing other users sound signals and presenting a sound signal reconstructed from the received RF signals to the first user's ears. Also, the transceiving units estimate relative position between one another and present the reconstructed sound signals to the users' ears in a manner related to the relative position estimate.

9 Claims, 3 Drawing Sheets

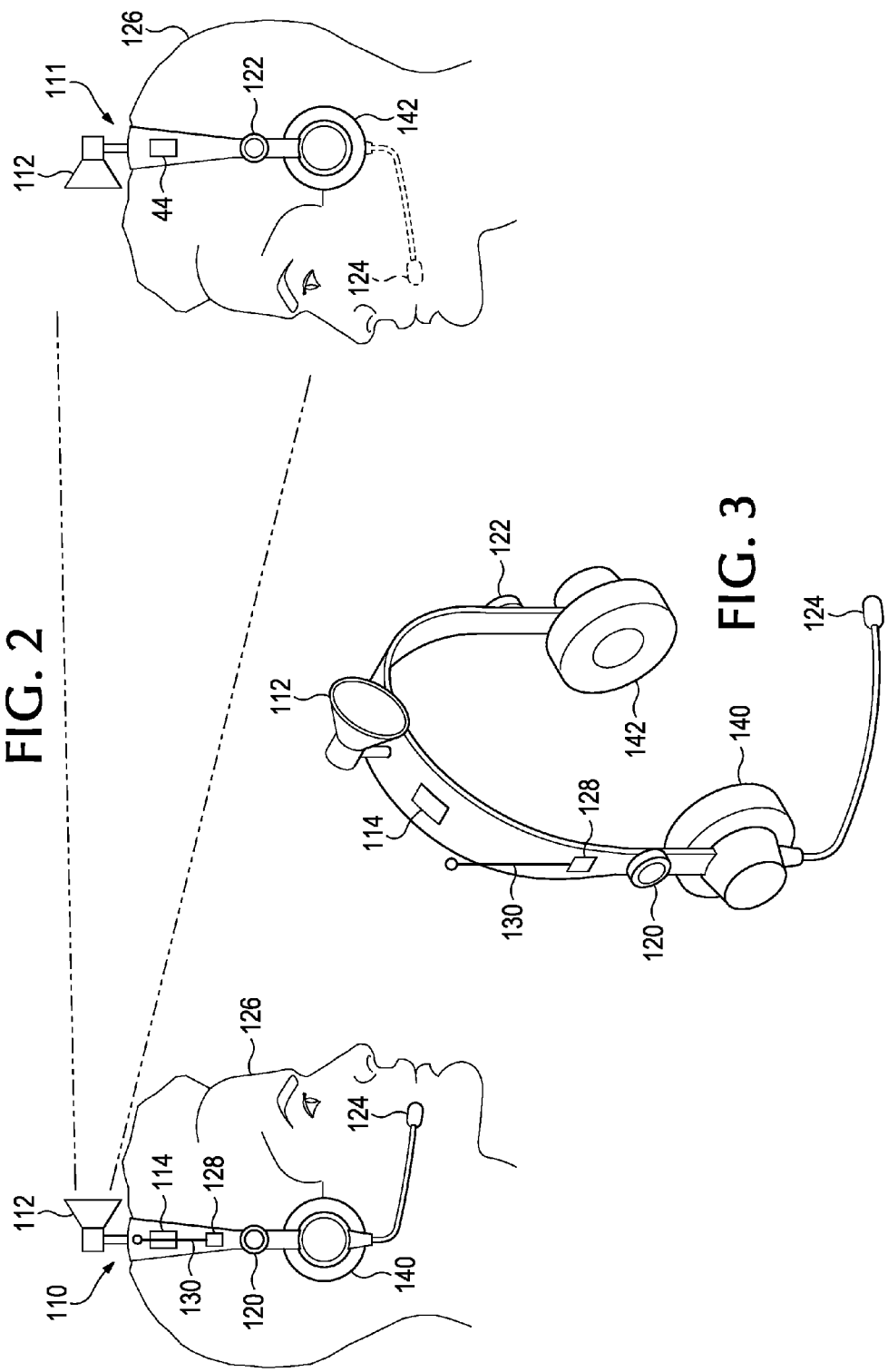

ELECTRONIC COMMUNICATION SYSTEM THAT MIMICS NATURAL RANGE AND ORIENTATION DEPENDENCE

BACKGROUND

Various RF systems for short range (<1 mile) communications currently exist, but most are geared to systems for permitting communications between people who are further than 100 feet apart. There are various situations, however, in which people who are relatively close together, even within 6 feet apart, could benefit from assistance in communications.

In a first situation, one or both of the people suffer from hearing loss. Because hearing aids tend to amplify background noise as well as sounds that the wearer wishes to hear, the ability to hear a speaker is typically not as good as it is if the speaker talks into a microphone from which the signals are sent to an apparatus that reconstructs the sounds and projects them directly into the listener's ear. This type of system is known, but in form that appears to presume a simple two person environment, in which just one person suffers from hearing impairment. If a group of 4-10 hearing impaired persons congregated, the system might not adequately permit an easy course of communications.

In a second situation, a group of people are gathered in a noisy environment, such as a crowded restaurant, a cocktail party or a nightclub. Communications may become strained in such an environment. Even very mild hearing loss can result in missed understanding. Further, even a person with no hearing impairment may experience difficulty understanding what is being said and may have to fill in the blanks with guesswork, potentially leading to embarrassing gaffs.

In a third situation, the people who wish to communicate are separated by less than 100 yards, but by far enough so that they cannot communicate comfortably without assistance. Although, as noted before, systems exist for aiding the communicators in this situation, the use of these systems tends to become difficult if more than two communicators wish to use the same system. It may be difficult to distinguish one or more of the communicators. The difficulty in distinguishing speakers also is present in telephone conversations where more than one person is sharing a speaker phone.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first separate aspect, the present invention may take the form of a short range telephonic communications system that includes transceiving units for receiving a sound signal from a first user and for transmitting an RF signal representative of the sound signal and for receiving RF signals representing other users sound signals and presenting a sound signal reconstructed from the received RF signals to the first user's ears. Also, the transceiving units estimate relative position between one another and present the reconstructed sound signals to the users' ears in a manner related to the relative position estimate.

In a second separate aspect, the present invention may take the form of a method of facilitating communications between a group of people, first by equipping each one of the group of people a microphone, positioned to receive voice sounds from the users, and a right earphone and a left earphone. An estimate is formed of the relative position between each two people in the group and sound received by the microphones of others in the group is reproduced in the earphones of the group, with characteristics of the sound being related to the relative positions.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced drawings. It is intended that the embodiments and figures disclosed herein are to be considered illustrative rather than restrictive.

FIG. 2 is an illustration of a relative system according to the present invention, in use.

FIG. 3 is an isometric view of a headset used in the system of FIG. 1.

DETAILED DESCRIPTION OF THE PREFERRED EMBODIMENT(S)

Figure 1:
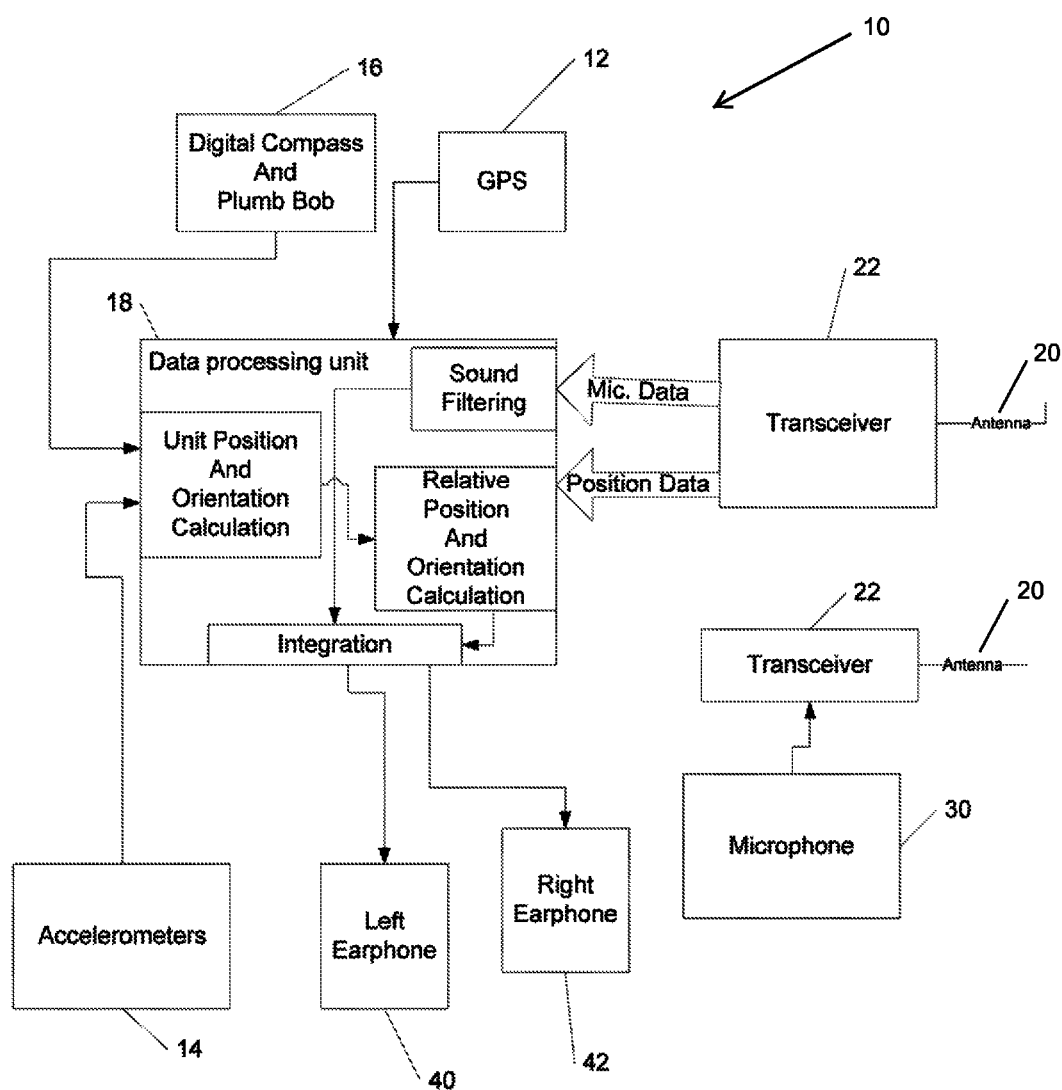
FIG. 1 is a block diagram, illustrating the operation of an absolute system, according to the present invention.

It is an object of some preferred embodiments of the present invention to provide a short range communications system that mimics the effects of distance and orientation between speaker and listener in human communications. Accordingly in a preferred embodiment the volume at which sounds are projected into a listening user's ears are related to the distance and orientation between a speaking user and a listening user.

One use of such a system would be for a group of 4 to 8 users seated together about a table in a noisy environment, such as a busy restaurant. If a first user is close to a second user and a third user, but wishes to speak principally to the second user he is likely to lean toward the second user and turn his head toward the second user. The system detects this change in orientation and range and increases the volume of the first user's voice in the second user's ears. Accordingly, the system users may communicate much as they would naturally, with no system present, except that the ability to hear each other is greatly augmented. In one preferred embodiment the range is compared to a threshold range and if it is greater than the threshold range, there is no effective transmission of sound from one user to another. In another preferred embodiment an index representing both sound and orientation is compared to a threshold value, so that a user in a restaurant does not hear the sounds from the table behind him, where people are similarly equipped with system enabled headphones. If the wait staff is equipped with head phones, then when a waiter approaches a particular table populated by system users, the waiter and the customers can communicate using their headsets, but when the waiter is further away, the people at that table are not bothered by the waiter's voice. One preferred embodiment includes "shout override" wherein if someone shouts into his or her microphone, a microphone volume threshold is exceeded and the range threshold is suspended and even people far away can hear what he is saying.

In another use environment, a group of interested persons at a soccer match all wear system units. If a first user wishes to speak to a second user he turns toward the second user, much as he would do naturally. If the second user can see the first user he may at this point recognize that the first user is preparing to speak to him and mentally prepare himself, perhaps without realizing it, to listen to the first user.

To gain these benefits it is necessary to have a system that measures range and relative orientation between transceiving units. There are a number of ways of performing these tasks, but the various methods can be divided into two broad categories: 1) an "absolute system" that monitors position and orientation of each unit relative to a coordinate system, such as latitude and longitude, deriving relative range and orientation from this information and 2) a "relative system" that directly measures relative range and orientation.

In one preferred embodiment of an absolute system accelerometers are used to keep track of orientation and location. Original orientation may be measured relative to a built-in compass that reports a direction electronically to a data processing unit. A unit is activated at a known location and orientation or a GPS receiving system is used to find the location of the system users.

In one embodiment a plumb bob is included to correct orientation relative to straight down. In one preferred embodiment, the accelerometers are periodically corrected by the compass and the plumb bob, for example every ten seconds, to prevent drift from becoming destructive. Two sets of three orthogonal accelerometers are present, one close to each ear on a head set, and the position of these two sets of accelerometers are compared to find the orientation of the head set, and by implication, the user's head. This comparison can also be used to correct errors, as while the head set is being worn, there must be a fixed relationship between the relative positions of the two sets of accelerometers and the orientation of each set of accelerometers.

FIG. 1 is a block diagram of such a system unit 10, which would physically take the familiar form of a headset with a microphone 30 and two earphones 40 and 42. A GPS 12 provides an initial position and updates when possible, and accelerometers 14 and a digital compass and miniature plumb bob 16 fill in when the GPS is not available, and provide greater detail of movement, including head movement. A data processing unit 18 receives and integrates data from the three aforementioned units, and also receives a similar data set from each of the identical units 10 from which unit 10 receives an RF signal by way of antenna 20 and transceiver 22. By receiving the position and head orientation data from the other units and comparing this information to the unit 10 location and orientation information, data processing unit 18 is able to determine if any one of the other users has his head pointed in the direction of unit 10. More specifically, the case of two headset wearers facing each other can be detected, and may be treated as a special case for placing the users into voice contact with one another.

Another portion of the RF signal is an encoded representation of the sound entering a microphone 30 and modulated to RF by the transceiver 22 of another headset, which will typically be the voice of another user. The signal will be represented to the user of unit 10 by way of earphones 40 and 42, provided that the range and orientation between units satisfies a predetermined condition. For example, the other user's head is facing the user of unit 10, and/or the other unit is within a designated range.

In a preferred embodiment, when the headphone for both ears is used, the orientation of a listener's orientation relative to the place where the sound is originating is used to place a volume difference and time delay into the sound waves generated by the speakers in order to mimic the natural volume difference and time delay that the sound waves would have if received directly from the sound originating location. This permits the user to tell from which direction the sound is originating.

In another preferred embodiment of an absolute system, the system is configured to operate in an area in which an RF antenna is broadcasting a directional signal that is received by two sets of three orthogonal inductors, one near each ear of a user. The relative power of reception of each inductor is used to determine the orientation of the inductor set relative to the known orientation of the electromagnetic field.

Figure 4:
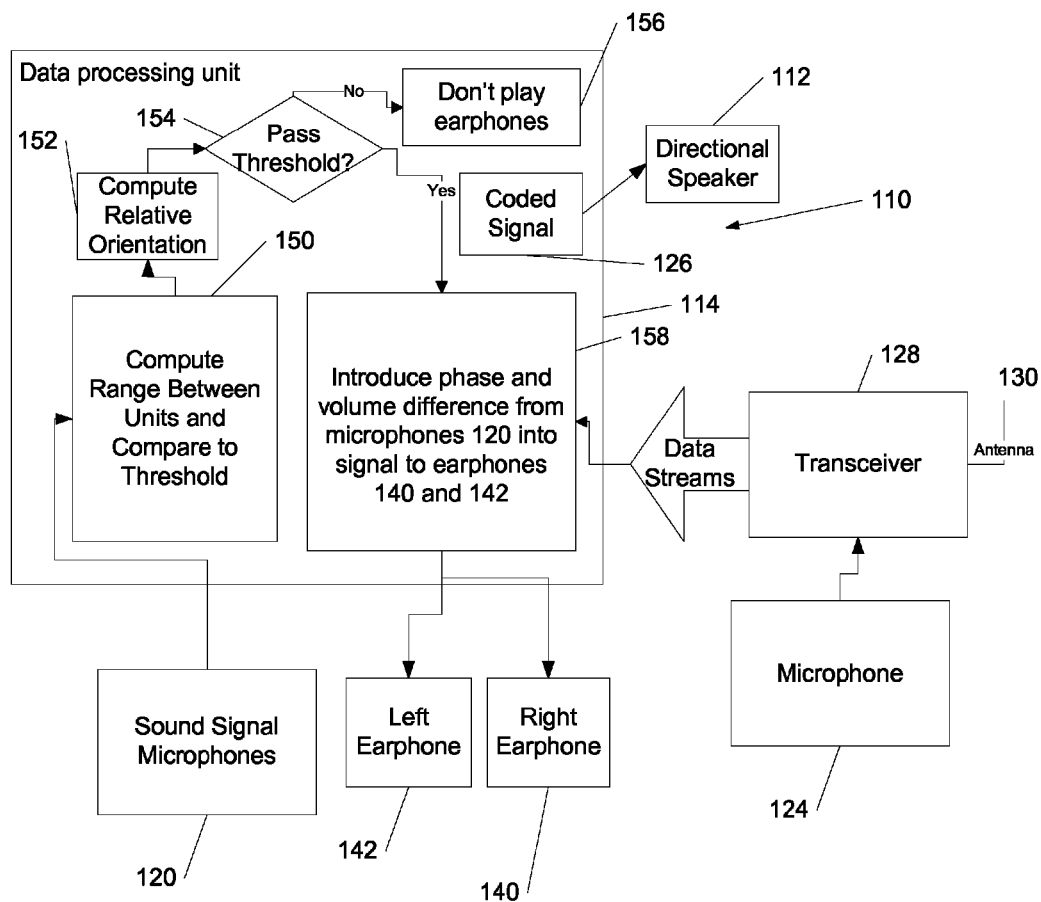
FIG. 4 is a block diagram, illustrating the operation of a relative system, according to the present invention.

In another preferred embodiment, shown in FIGS. 2-4, both a first headset unit 110 and a second, identical, headset unit 111, form part of the system. For ease of presentation, because the units are identical, both systems (and additional units not shown in FIG. 1, but included within the scope of the invention) are described by the following description of first unit 110.

First unit 110 is equipped with a directional speaker 112 that produces sound at a range above that of human hearing, for example in the range of 100,000 Hz (wavelength of about 3 mm) to 1,000,000 Hz (wavelength of about 0.3 mm). Moreover, unit 110 has a data processing unit 114 having a coded signal producer 126 adapted to drive speaker 112 to produce a coded sound signal. Units 110 and 111 also include a right-side microphone 120 and a left-side microphone 122, so that second unit 111 receives sound from the speaker 112 of first unit 110, in both microphone 120 and microphone 122, which send a related electrical signal to logic and control unit 114. Accordingly a coded signal generator 126 of a first unit 110 produces a first sound signal marked with a first code. A second unit 111 upon receiving the first coded signal by way of microphones 120, 122 and decoding it by logic and control unit 114, sends back a second coded signal in a second code, that is dependent on the first code, so that the first unit, upon receiving the second coded sound signal is able to determine that it is the response of the second unit 111 to the recently transmitted sound signal from the first unit 110. The processing time that the second unit 111 takes to transmit the second signal after receiving the first signal is known, and can accordingly be subtracted from the delay between the time the first signal is sent and the second signal is received by the first unit 110, yielding the round trip time, which divided by the round trip speed of sound yields the distance (block 50, FIG. 4). In an alternative embodiment, each signal sent by speaker 112 is time stamped and after reception by another unit 110, this time stamp can be compared with the present time, to arrive at a sound signal travel time and therefore a distance.

Unit 110 is also equipped with a mouth microphone 124 positioned to receive the voice of a user 126. The resultant electrical signal from microphone 124 is used, by modulation unit 128, to modulate an RF signal that is broadcast by antenna 130 and received by the matching antenna 130 of the second unit 111. The second unit 111 receives this signal by way of antenna 130, demodulates the signal, and with some further processing that is described below, sends the signal to a right-side headphone 140 and a left-side headphone 142.

In addition to determining distance or range between units 110, in one preferred embodiment, the data processing units 114 use the signals received from microphones 120, 122 much as the human brain does with the signal from the ears, to determine the position and orientation of the sound signal originating speaker 112, relative to the microphones 120, 122. This is done by comparing the time delay and volume of the signal received in the right-side microphone 120 versus left-side microphone 122. The signals driving headphones 140 and 142 are modulated to reflect the position of the speaker 112, relative to microphones 120 and 122, to permit the user 126 to detect sound directionality. In an alternative preferred embodiment, the data processing unit 114, does not determine position and orientation of any speaker 112, but simply adds the time delay and volume differences found between the signals from microphones 120 and 122, into the signals going to headphones 140 and 142, respectively, thereby effectively providing sound direction information to the user.

In addition, the range information found as described above can be used to determine the volume of sound to be produced by a right-side headphone 140 and a left-side headphone 142. In a preferred embodiment, if the range determined by the sound signal system of speaker 112 and microphones 120 is above a threshold (decision box 154, FIG. 4), no sound responsive to the microphone 124 of the first unit is produced by the headphones 140 and 142 of the second unit 111.

The volume of the received sound signal also is helpful in determining how loud the system should represent the sounds associate with the received RF signal from the other unit, as this volume is proportional to range and relative orientation, much as the actual voice sounds from the user are.

In a preferred embodiment, the range is divided by the magnitude of the weaker of the two sound signals received by microphones 120 and 122, to form an estimate of the degree to which the first and second users are facing each other (block 152, FIG. 4), and this estimate is compared to a threshold (decision box 154, FIG. 4) to determine if the voice signal from microphone 124 of unit 110 should be presented to the second user 128, by way of the headphones 140 and 142 of the second unit. In another preferred embodiment, the same calculation is performed, but with the stronger of the two signals received by microphones 120 and 122, to determine if first unit 110 is facing second unit 111, regardless of how second unit 111 is facing. This second option would be useful in a commander, commanded situation, for example the workers at a fast food restaurant, enabling a supervisory employee to look at a subordinate, speak and be heard, regardless of whether the subordinate was facing the supervisory employee or whether loud machinery was operating. Also the employees not being faced by the supervisor would not be interrupted or distracted from their tasks or both, by the supervisor's voice on the headphone system. Additionally, a system that does not send a signal to everyone permits a greater degree of privacy in communications.

Because the speed of sound is dependent on altitude, in a preferred embodiment the altitude at which the units will be used is entered during an initialization process performed by docking each unit to a computer using a USB connector cord. A user interface then appears on the computer screen and the user is guided to input information such as altitude. Users are advised that if they change altitude by more than 1,500 feet that it is advisable to reenter the altitude information so that the range calculations will not be corrupted by change in speed of sound with altitude. In another preferred embodiment, the wireless communications apparatus of each unit is used to establish a communicative link with a computer and in similar manner the altitude is entered by a user. In another preferred embodiment, a similar coding scheme is used to establish range between units using RF signals.

In one preferred embodiment each unit is headphone having a speaker for both ears and a microphone supported near the user's mouth. In an alternative preferred embodiment, some or all of the units may be in the form of a device that clips onto a user's ear and that has a microphone extending toward the user's mouth.

In a preferred embodiment of either an absolute or a relative system, auditory noise is discriminated against by comparing the signals received by all of the microphones of the various units. In one embodiment, the data processing unit 114 of each unit does this separately. One method of performing such an operation is to perform fast Fourier transforms of the incoming sound, and filter out those frequencies that are being received in all the microphones, likely background noise, while retaining those frequencies found in a single microphone, which would most likely correspond to the voice of a speaker.

In a similar system, dual microphones about a head's width apart are used to receive sound in a speaker phone, and this sound is reconstructed in the earphones of listeners of a telephone connected with the speaker phone, to enable the listeners to tell speakers apart on the basis of their reconstructed locations. Headphones may be used to produce sound on both ends of the telephone connection, with a pair of spaced microphones adapted to receive sound on both ends.

In a preferred embodiment each unit also includes a cell phone, so that a user may contact any cell phone equipped person by dialing their telephone number or may also be placed into communication with any other system unit user who is within range, has the correct orientation and has chosen to permit this type of contact.

Although possible systems have been described in terms of relative or absolute systems, it falls within the scope of this application to have a system that includes elements of both types of systems. In one preferred embodiment, one or more headsets is configured for a hearing impaired person, with amplification of received sound signals in the frequencies most needed.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A short range telephonic communications system, comprising:
(a) a first transceiving unit having a first microphone for receiving sound and an RF antenna assembly for transmitting a first RF signal representative of said sound received by said first microphone and for receiving RF signals;
(b) a second transceiving unit, having a second microphone for receiving second and an RF antenna assembly for transmitting a second RF signal representative of said sound received by said second microphone;
(c) wherein said second transceiving unit includes a second speaker assembly and receives said first RF signal and creates a first reconstructed sound signal, which is emitted by said second speaker assembly, representative of said sound received by said first microphone, and wherein said first transceiving unit includes a first speaker assembly and receives said second RF signal and creates a second reconstructed sound signal, which is emitted by said first speaker assembly and is representative of said sound received by said second microphone; and
(d) wherein said system forms an estimate relative position, including relative orientation, between first transceiving unit and said second transceiving unit and wherein said first and second reconstructed sound signals are emitted by said second and first speaker systems, respectively, at a volume related to said relative position estimate, including relative orientation.

2. The short range telephone communications system of claim 1, wherein transceiving units that are additional to said first and second transceivers, but identical in operation, are also part of said system.

3. The short range telephone communications system of claim 1, wherein said relative position includes range between units and wherein said reconstructed sound signals have a volume related to range.

4. The short range telephone communications system of claim 3, wherein said distance is compared with a threshold and if said distance is greater than said threshold for said first and second transceiving units no sound is reconstructed in either of said first and second transceiver, from signals received from said second and first transceiver, respectively.

5. The short range telephone communications system of claim 3, wherein range is estimated by measuring sound travel time between two transceivers.

6. The short range telephone communications system of claim 3, wherein range is estimated by estimating the location of each unit in an absolute coordinate system, and taking the difference.

7. The short range telephone communications system of claim 1, wherein, sound volume reproduced is relatively louder for a first relative orientation and relatively softer for a second relative orientation.

8. The short range telephone communications system of claim 7, wherein sound volume reproduced between two units is louder if said two units are facing each other and softer if said two units are facing away from each other.

9. A method of facilitating communications between a group of people, comprising:
    (a) providing each one of said group of people with a microphone, positioned to receive voice sounds from said users, and a right earphone and a left earphone;
    (b) estimating the relative position between each two people in said group, including relative orientation between the heads of said two people;
    (c) creating, in said earphones, reproduced sound, reproduced from sound received in said microphones of others of said group, with characteristics of said sound being related to said relative positions; and
    (d) providing each one of said group of people with an outwardly facing right ear microphone and an outwardly facing left ear microphone and a speaker driven to emit coded sound signals in a frequency higher than the human hearing range, and wherein relative orientation a first unit and a second unit is determined by transmitting a directional ultrasound signal from said speakers and measuring and comparing the strength of said signal at said left ear microphone and said right ear microphone of each unit.

* * * * *

UNITED STATES PATENT AND TRADEMARK OFFICE
CERTIFICATE OF CORRECTION

| | |
|---|---|
| PATENT NO. | : 8,761,674 B2 |
| APPLICATION NO. | : 13/035225 |
| DATED | : June 24, 2014 |
| INVENTOR(S) | : Timothy R. Beevers |

It is certified that error appears in the above-identified patent and that said Letters Patent is hereby corrected as shown below:

In the Claims

Column 6, Line 50, in claim #1b, the word "second" should be replaced by the word "sound", as follows:

"a second transceiving unit, having a second microphone for receiving sound and an RF antenna assembly for transmitting a second RF signal representative of said sound received by said second microphone;"

Signed and Sealed this
Fifth Day of April, 2016

Michelle K. Lee
*Director of the United States Patent and Trademark Office*